(12) United States Patent
Kelly et al.

(10) Patent No.: US 8,301,683 B2
(45) Date of Patent: Oct. 30, 2012

(54) METHOD OF ENHANCING MULTIMEDIA

(75) Inventors: Declan Patrick Kelly, Eindhoven (NL); Yang Peng, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 2265 days.

(21) Appl. No.: 10/530,382

(22) PCT Filed: Sep. 18, 2003

(86) PCT No.: PCT/IB03/04160
§ 371 (c)(1),
(2), (4) Date: Apr. 6, 2005

(87) PCT Pub. No.: WO2004/034281
PCT Pub. Date: Apr. 22, 2004

(65) Prior Publication Data
US 2006/0104174 A1 May 18, 2006

(30) Foreign Application Priority Data
Oct. 9, 2002 (EP) .................................... 02292489

(51) Int. Cl.
*G06F 15/16* (2006.01)
(52) U.S. Cl. ....................................................... 709/200
(58) Field of Classification Search .................. 709/200; 707/100
See application file for complete search history.

(56) References Cited

U.S. PATENT DOCUMENTS

| 2002/0078144 A1* | 6/2002 | Lamkin et al. ................ 709/203 |
| 2002/0088011 A1 | 7/2002 | Lamkin et al. |
| 2004/0136698 A1* | 7/2004 | Mock ............................ 386/123 |

FOREIGN PATENT DOCUMENTS

| JP | 2001356851 | 12/2001 |
| WO | 0115168 A1 | 3/2001 |
| WO | 0205104 A1 | 1/2002 |
| WO | 0208927 A1 | 1/2002 |
| WO | 0205744 A2 | 6/2002 |
| WO | 0205744 A3 | 6/2002 |

OTHER PUBLICATIONS

David R. Guenette, et al: CD-ROM and Web Browsers, E-MEDIA, Aug. 1996, pp. 1-22, XP002088423.
The U. S. Department of Energy; Computer Incident Advisory Capability, CIAC, Mar. 1998, pp. 1-9, XP-002145971.
ISR for Publication, International Publication No. WO2004/034281, year 2004.

* cited by examiner

*Primary Examiner* — Joseph Avellino
*Assistant Examiner* — Marshall McLeod

(57) ABSTRACT

A method of enhancing multimedia data contained on an information carrier includes reading the carrier and communicating with a remote unit via a network. The information carrier contains additional data. The method includes reading from the information carrier a user file containing user data defining user's previous actions in a storage unit of a recording and/or reproducing device, providing the additional data as a function of the user data, and updating the user data to reflect the user's latest actions.

4 Claims, 1 Drawing Sheet

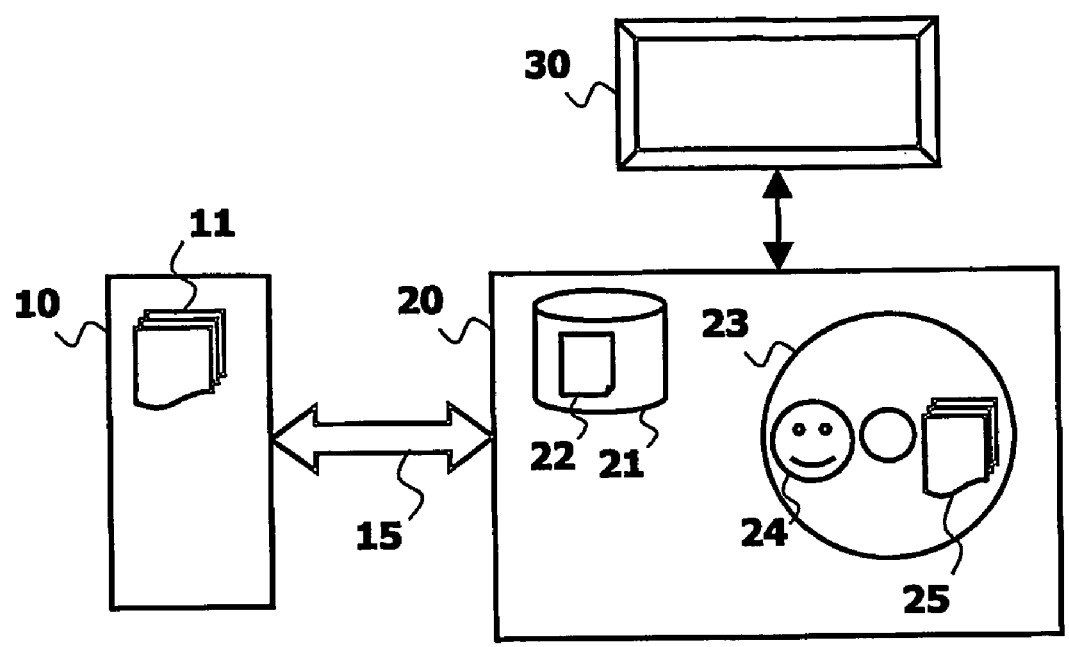

METHOD OF ENHANCING MULTIMEDIA

FIELD OF THE INVENTION

The present invention relates to a method of enhancing multimedia data contained on an information carrier.

The present invention also relates to an information carrier containing multimedia data and to a computer program implementing said method of enhancing multimedia data.

This invention is particularly relevant for DVD video discs, such discs being intended to be used in a DVD recorder and/or player communicating with web servers via the Internet network.

BACKGROUND OF THE INVENTION

The DVD Forum has established a working group AH1-12 to standardize web connected DVD, as an extension of the current DVD video specification. The principle is that a DVD video disc in accordance with the new specification will be published with links to publisher's web sites that contain additional data directly related to said specific DVD video disc. The web site may include, for example, new navigation menus which can be downloaded and used by a DVD video player containing the DVD video disc instead of original menus.

By using user data called cookies, defined as part of the hypertext transfer protocol http, the additional data presented by the web site can be customized on the basis of said user data contained in a user file and corresponding to previous actions of the user. As a consequence, cookies allow web sites to maintain user information across http connections.

SUMMARY OF THE INVENTION

It is an object of the invention to propose a communication method that allows the same customization features to be provided when the additional data are coming from the disc instead of the web site.

In effect, it can be convenient to write additional data directly on the information carrier and then to consult them off-line, i.e. without being connected to the web site via the Internet, in the same manner as additional data contained on the web site are consulted.

To this end, the method of enhancing multimedia data in accordance with the invention is characterized in that the information carrier comprises additional data and in that said method comprises the following steps performed, using a code contained on the information carrier:

reading a user file containing user data defining user's previous actions in a storage unit of a recording and/or reproducing device, providing the additional data as a function of the user data, and updating the user data to reflect the user's latest actions.

Such a method allows the additional data to be customized, based on the user's past behavior, when said additional data are coming from the information carrier, that is to say when the recording and/or reproducing device is not connected to the Internet network.

The method of enhancing multimedia data in accordance with the invention is also characterized in that it comprises the following steps performed from a remote unit, when the recording and/or reproducing device is connected to said remote unit via a network, the remote unit containing additional data:

reading the user file containing the user data in the storage unit, providing the remote unit additional data as a function of the user data, and updating the user data to reflect the user's latest actions.

In this case, the user file used by the remote unit is the same as the user file used by the information carrier. This ensures consistency across successive sessions, said sessions being performed either from the information carrier, that is to say off-line, or from the remote unit, that is to say on-line.

The present invention also relates to an information carrier comprising multimedia data and additional data for enhancing the multimedia data.

It finally relates to a computer program comprising program instructions for implementing the method of enhancing multimedia data.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram showing the method of enhancing multimedia data in accordance with the invention.

DETAILED DESCRIPTION OF THE INVENTION

The present invention relates to a method of communicating data between a recording and/or reproducing device and a remote unit connected to each other via a network. In the following description, the recording and/or reproducing device is a DVD video player, the remote unit is a web site, and the network is the Internet.

Nevertheless, it will be obvious to a person skilled in the art that the present invention more generally relates to client/server architecture. On the client side, the recording and/or reproducing device is, for example, a home DVD player or a personal computer DVD player with an Internet connection and a protocol stack built into it, or a GPRS (General Packet Radio Service) or third-generation mobile phone equipped with Small Format Factor Optical SFFO discs. On the server side, the remote unit is a computer system having web-related services or proxies running on it. The network that connects the two sides is any kind of network based on a TCP/IP protocol (Transmission Control Protocol/Internet Protocol), for example IPv4 or IPv6 protocol.

FIG. 1 is a block diagram showing the communication system in accordance with the invention. Said communication system comprises a DVD video player and/or recorder (20), which is able to read an information carrier (23). The information carrier comprises multimedia data (24) such as audio, video, or text data.

In our example, the information carrier (23) is a DVD video disc, but it will be apparent to a person skilled in the art that the present invention is not limited to DVD discs. The scope of the present invention generally includes any medium having any physical disc format (e.g. CD, DVD, Blu-ray disc, etc.), including Read Only, Recordable, and Rewritable discs. The present invention generally applies to discs that include different application formats (e.g. video, audio, games, etc.).

The web site (10) comprises additional data (11) for the DVD video disc (23). A publisher is responsible for managing the web site (10) from inputs of a disc provider, the publisher and provider being the same person or different persons. The DVD video player (20) and the web site (10) communicate via the Internet (15).

The DVD video disc contains links to publisher's web sites. When such a disc is inserted into the DVD video player, users can combine local DVD multimedia data (24) with additional data (11), which are formed by Internet-enhanced content directly related to this specific DVD video disc. The Internet-enhanced content is, for example, a new version of DVD menus, pictures, audio, or subtitles synchronized with local DVD video. DVD disc providers create the Internet-enhanced content. The Internet-enhanced content is also called enhanced navigation (ENAV) content.

The DVD video disc also comprises additional data (25), which are not necessarily identical to the ENAV content present on the web site (10). The ENAV content contained on the information carrier (23) can be updated from the web site (10).

The principle of the invention is to allow the ENAV content contained on the DVD video disc to read or write user data, hereinafter referred to as cookies, in the same way that it is done over the http protocol. This allows the same behavior to be presented to the user from both the disc and the web site. It also ensures consistency across sessions from the disc, i.e. off-line, and from the web site, i.e. on-line.

To support this feature, the DVD player comprises Application Program Interfaces or APIs, which are able to read or write cookies. These APIs are called from within the scripting part of the ENAV content. As with http, the cookies will be identified with the web site that stored them in a storage unit (21) of the DVD player (20). In this case, the web site (10) linked to the DVD disc (23) is used to identify the web server containing the web site. By using this web server, the same cookies can be used by both the web site related to the disc and the disc content itself. The viewing experience of the user will then be consistent across off-line and on-line viewing of the same disc.

It is possible to keep the off-line and on-line cookies distinct. This prevents the web server from tracking the user's off-line behavior. In this case, however, the viewing experience will not be consistent between off-line and on-line viewing.

The APIs are defined as follows:
ReadCookie(IN server_id, OUT cookie_string);
where IN means input and OUT means output.
This API reads the cookie stored with a server identifier server_id and returns the associated user data cookie_string if there is such an entry in the cookie file. If not, then the returned user data cookie_string is empty.
WriteCookie(IN server_id, IN cookie_string);
This API writes an entry in the cookie file with a server identifier server_id to identify the server and user data cookie_string as the associated data. It overwrites the previous cookie related to this server if there was one.

In this case, the APIs are equivalent to receiving and returning cookies according to the http protocol. In another embodiment, the cookie identifier can be extended to the disc itself. In other words, the APIs can read or write user data cookie_string only for a predetermined web server and for a predetermined disc.

The following example illustrates the method in accordance with the invention. First, the user inserts a DVD disc (23) in a DVD player (20) which is connected to the web. This disc includes ENAV content including a link to the publisher's web site (10). For example, a link is: http:/www.publisher.com/film. Then, the DVD player connects to this web site in order to use the on-line ENAV content (11). For that purpose, the web server tries to read a cookie file (22) from the DVD player. The web server can only access cookies that were stored by the same server in the storage unit (21) of the DVD player. In the present case, the web server can only read a cookie having a prefix www.publisher.com. If such a cookie is available, it is returned to the web server. The web server can update the cookie later to reflect the user's action(s), for example it can store a coded string to indicate what features of the disc the user has accessed.

Later, if the user inserts the disc while the DVD player is off-line, the DVD player uses the ENAV content (25) contained on the disc instead of the one contained on the web site. According to the present invention, the scripts contained within the ENAV content on the disc read the cookie files from the DVD player. The API call is the following:
ReadCookie(www.publisher.com, cookie_string);
In this case, the script written on the disc makes the DVD player return to the web site www.publisher.com the user data cookie_string that was stored by the web server in a previous session. The content of these user data allows the script in the ENAV content to customize the presentation displayed on a screen (30) based on the user's past behavior.

When the off-line session is finished, the script written on the disc makes the DVD player update the cookie file to reflect the user's behavior, that is to say which features have been accessed by said user. The API call is the following:
WriteCookie(www.publisher.com, cookie_string);
In this case, the script written on the disc makes the DVD player write in the cookie file the cookie string cookie_string that reflects the user's latest action(s), in a coded or non-coded manner.

The present invention ensures that the presentation of the ENAV content is made in a seamless way between on-line and off-line sessions.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A method of enhancing multimedia data contained on an information carrier, said information carrier also containing additional carrier data, said method comprising the following acts:
   reading a user file containing user data defining previous actions of a user, in a storage unit of a recording and/or reproducing device,
   providing, in an off-line session, the additional carrier data as a function of the user data,
   updating the user data to reflect a latest off-line action of the user,
   providing, in an on-line session, additional remote data from a remote unit as a function of the user data, the remote unit being connected to the recording and/or reproducing device via a network, and
   updating the user data to reflect a latest on-line action of the user so that a viewing experience of the user is consistent during both the off-line session and the on-line session and same customization features are provided when the additional carrier data are coming from the information carrier or when the additional remote data are coming from the remote unit.

2. An information carrier comprising multimedia data and additional carrier data for enhancing the multimedia data, said information carrier further comprising:

means for reading a user file containing user data defining previous actions of a user, in a storage unit of a recording and/or reproducing device, means for providing, in an off-line session, the carrier additional data as a function of the previous actions of the user, means for providing, in an on-line session, additional remote data from a remote unit as a function of the previous actions of the user, and means for updating the user data in the user file as a function of latest actions the user so that a viewing experience of the user is consistent during both the off-line session and the on-line session and same customization features are provided when the additional carrier data are coming from the information carrier or when the additional remote data are coming from the remote unit.

3. A recording and/or reproducing device adapted to read an information carrier containing multimedia data and additional carrier data for enhancing the multimedia data, said device comprising:

means for reading a user file containing user data defining previous actions of a user, in a storage unit of the recording and/or reproducing device, means for providing, in an off-line session, the additional carrier data as a function of the previous actions of the user, means for providing, in an on-line session, additional remote data from a remote unit as a function of the previous actions of the user, and means for updating the user data in the user file as a function of latest actions the user so that a viewing experience of the user is consistent during both the off-line session and the on-line session and same customization features are provided when the additional carrier data are coming from the information carrier or when the additional remote data are coming from the remote unit.

4. A computer program stored on a non-transitory computer readable medium, the computer program comprising program instructions for implementing the method of enhancing multimedia data as claimed in claim 1, when said program is executed by a processor.

\* \* \* \* \*